: US 11,475,685 B2
(45) Date of Patent: Oct. 18, 2022

(12) United States Patent
Goel et al.

(54) SYSTEMS AND METHODS FOR MACHINE LEARNING BASED INTELLIGENT OPTICAL CHARACTER RECOGNITION

(71) Applicant: FMR LLC, Boston, MA (US)

(72) Inventors: Nilesh Goel, Kolkata (IN); Samir Kakkar, Bangalore (IN); Shruthi Kulkarni, Bangalore (IN); Diksha Arora, Kurukshetra (IN)

(73) Assignee: FMR LLC, Boston, MA (US)

( * ) Notice: Subject to any disclaimer, the term of this patent is extended or adjusted under 35 U.S.C. 154(b) by 92 days.

(21) Appl. No.: 17/071,490

(22) Filed: Oct. 15, 2020

(65) Prior Publication Data

US 2022/0121842 A1 Apr. 21, 2022

(51) Int. Cl.
*G06V 30/40* (2022.01)
*G06F 16/951* (2019.01)
*G06N 20/00* (2019.01)
*G06V 30/10* (2022.01)

(52) U.S. Cl.
CPC .......... *G06V 30/40* (2022.01); *G06F 16/951* (2019.01); *G06N 20/00* (2019.01); *G06V 30/10* (2022.01)

(58) Field of Classification Search
CPC ........ G06V 30/10; G06F 16/93; G06F 16/285
See application file for complete search history.

(56) References Cited

U.S. PATENT DOCUMENTS

| 10,129,211 B2* | 11/2018 | Heath | G06Q 30/02 |
| 2010/0010968 A1* | 1/2010 | Redlich | G06Q 10/00 |
| | | | 707/E17.046 |
| 2016/0092730 A1 | 3/2016 | Smirnov et al. | |
| 2019/0065840 A1 | 2/2019 | Saxena et al. | |
| 2019/0384971 A1 | 12/2019 | Borodin | |

* cited by examiner

Primary Examiner — King Y Poon
Assistant Examiner — Michael L Burleson
(74) Attorney, Agent, or Firm — Cesari & McKenna, LLP (57) ABSTRACT

Systems and methods for generating notifications based on extracted data from documents using a machine learning algorithm. The method includes receiving a document uploaded by a user including data corresponding to the user. The method further includes receiving an indication from the user granting permission to extract the data from the document. The method also includes extracting the data from the document using optical character recognition. The method further includes determining a document type based on the extracted data and document format data using a machine learning algorithm. The method also includes verifying the extracted data based on the determined document type and user data. The method also includes identifying a triggering event corresponding to the document based on the extracted data and the user data. The method further includes generating a notification corresponding to the triggering event.

20 Claims, 8 Drawing Sheets

| Filename | Category | State | City | Last Updated | Type of Document | Company Name |
|---|---|---|---|---|---|---|
| Driving License | Driving License | Texas | Dallas | 01/01/2020 | Government | Government |
| SS-8 Form | Tax | Massachusetts | Boston | 01/01/2020 | Government | Government |
| Car Insurance | Insurance | Massachusetts | Boston | 01/01/2020 | Private | State Street |
| Health Insurance | Insurance | Massachusetts | Boston | 01/01/2020 | Private | Religare |
| Trading License | License | Massachusetts | Boston | 01/01/2020 | Government | Government |
| Driving License | Driving License | Massachusetts | Boston | 01/01/2020 | Government | Government |

SYSTEMS AND METHODS FOR MACHINE LEARNING BASED INTELLIGENT OPTICAL CHARACTER RECOGNITION

FIELD OF THE INVENTION

The present invention relates generally to systems and methods for extracting data from documents using optical character recognition, including systems and methods for extracting and verifying data from documents using intelligent optical character recognition and machine learning-based algorithms.

BACKGROUND OF THE INVENTION

Optical character recognition (OCR) is a technology that enables conversion of different types of documents into editable and searchable data. OCR can be performed on documents such as scanned paper documents, PDF files, or images captured by a digital camera. The OCR process helps to extract and repurpose data from the images or documents by digitizing the handwritten or printed text into machine-encoded text.

Because OCR is done on images or scanned documents, making sure of the accuracy and the context of the data can be a challenge. The output of any traditional optical character recognition is the text on which edits or search operation can be performed. However, the OCR process does not return contextual information nor the credibility of the data extracted. Further, the traditional OCR process does not perform any further action on or with the data that is extracted.

SUMMARY OF THE INVENTION

Accordingly, an object of the invention is to provide systems and methods for extracting data from documents using intelligent optical character recognition. It is an object of the invention to provide systems and methods for verifying the extracted data from documents using a machine learning algorithm. It is an object of the invention to provide systems and methods for identifying triggering events corresponding to the documents based on the extracted data and user data. It is an object of the invention to provide systems and methods for generating notifications corresponding to the identified triggering events. It is an object of the invention to provide systems and methods for generating notifications based on extracted data from documents using a machine learning algorithm.

In some aspects, a method for generating notifications based on extracted data from documents using a machine learning algorithm includes receiving, by a server computing device, a document uploaded by a user. The document including data corresponding to the user. The method further includes receiving, by the server computing device, an indication from the user granting permission to extract the data from the document. The method also includes, in response to receiving the indication, extracting, by the server computing device, the data from the documents using optical character recognition. The method also includes determining, by the server computing device, a document type based on the extracted data and document format data from a first database using a machine learning algorithm. Further, the method includes verifying, by the server computing device, the extracted data based on the determined document type and user data from a second database. The method also includes, in response to verifying the extracted data, identifying, by the server computing device, a triggering event corresponding to the document based on the extracted data and the user data. Further, the method includes generating, by the server computing device, a notification corresponding to the triggering event.

In some embodiments, the document is one of a government-issued document or a privately-issued document. For example, in some embodiments, the document is one of a government-issued license, a government-issued tax document, or a privately-issued insurance document.

In some embodiments, the server computing device is further configured to prompt the user with a query corresponding to the indication. In some embodiments, the server computing device is further configured to periodically update the first database with data from websites.

In some embodiments, the server computing device is further configured to update the document format data from the first database based on the determined document type. In some embodiments, the server computing device is further configured to update the user data from the second database based on the extracted data.

In some embodiments, wherein the triggering event includes a deadline for performing an action corresponding to the document. In some embodiments, the server computing device is further configured to generate for display the notification on a user device.

In some embodiments, the server computing device is further configured to identify a website for performing an action corresponding to the triggering event. For example, in some embodiments, the notification includes information corresponding to the website and the action. In some embodiments, the server computing device is further configured to generate an email to the user including the notification.

In some aspects, a system for generating notifications based on extracted data from documents using a machine learning algorithm includes a server computing device communicatively coupled to a first database, a second database, and a user device. The server computing device is configured to receive a document uploaded by a user. The document including data corresponding to the user. The server computing device is also configured to receive an indication from the user granting permission to extract the data from the document. Further, the server computing device is configured to, in response to receiving the indication, extract the data from the document using optical character recognition. The server computing device is also configured to determine a document type based on the extracted data and document format data from the first database using a machine learning algorithm.

Further, the server computing device is configured to verify the extracted data based on the determined document type and user data from the second database. The server computing device is further configured to, in response to verifying the extracted data, identify a triggering event corresponding to the document based on the extracted data and the user data. The server computing device is also configured to generate a notification corresponding to the triggering event.

In some embodiments, the document is one of a government-issued document or a privately-issued document. For example, in some embodiments, the document is one of a government-issued license, a government-issued tax document, or a privately-issued insurance document.

In some embodiments, the server computing device is further configured to prompt the user with a query corresponding to the indication. In some embodiments, the server computing device is further configured to periodically update the first database with data from websites.

In some embodiments, the server computing device is further configured to update the document format data from the first database based on the determined document type. In some embodiments, the server computing device is further configured to update the user data from the second database based on the extracted data.

In some embodiments, wherein the triggering event includes a deadline for performing an action corresponding to the document. In some embodiments, the server computing device is further configured to generate for display the notification on the user device.

In some embodiments, the server computing device is further configured to identify a website for performing an action corresponding to the triggering event. For example, in some embodiments, the notification includes information corresponding to the website and the action. In some embodiments, the server computing device is further configured to generate an email to the user including the notification.

Other aspects and advantages of the invention can become apparent from the following drawings and description, all of which illustrate the principles of the invention, by way of example only.

BRIEF DESCRIPTION OF THE DRAWINGS

The advantages of the invention described above, together with further advantages, may be better understood by referring to the following description taken in conjunction with the accompanying drawings. The drawings are not necessarily to scale, emphasis instead generally being placed upon illustrating the principles of the invention.

DETAILED DESCRIPTION OF THE INVENTION

In some aspects, the systems and methods described herein can include one or more mechanisms or methods for extracting data from documents using intelligent optical character recognition. The system and methods can include mechanisms or methods for verifying the extracted data from documents using a machine learning algorithm. The systems and methods described herein can provide systems and methods for identifying triggering events corresponding to the documents based on the extracted data and user data. The systems and methods described herein can include one or more mechanisms or methods for generating notifications corresponding to the identified triggering events. The systems and methods described herein can facilitate users with systems and methods for generating notifications based on extracted data from documents using a machine learning algorithm.

Figure 1:
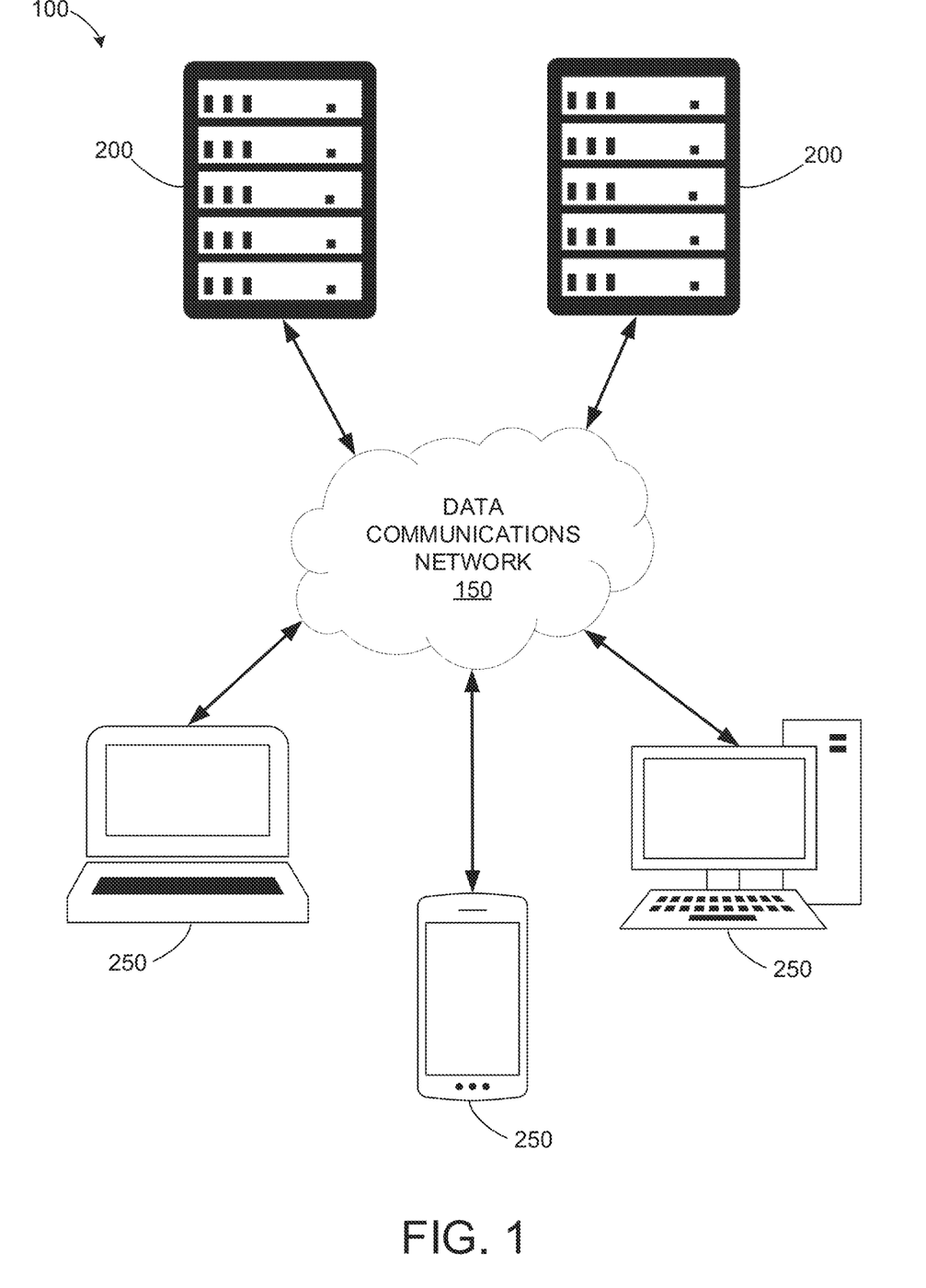
FIG. 1 is a block diagram of an exemplary data communications network, according to embodiments of the technology described herein.
Figure 2:
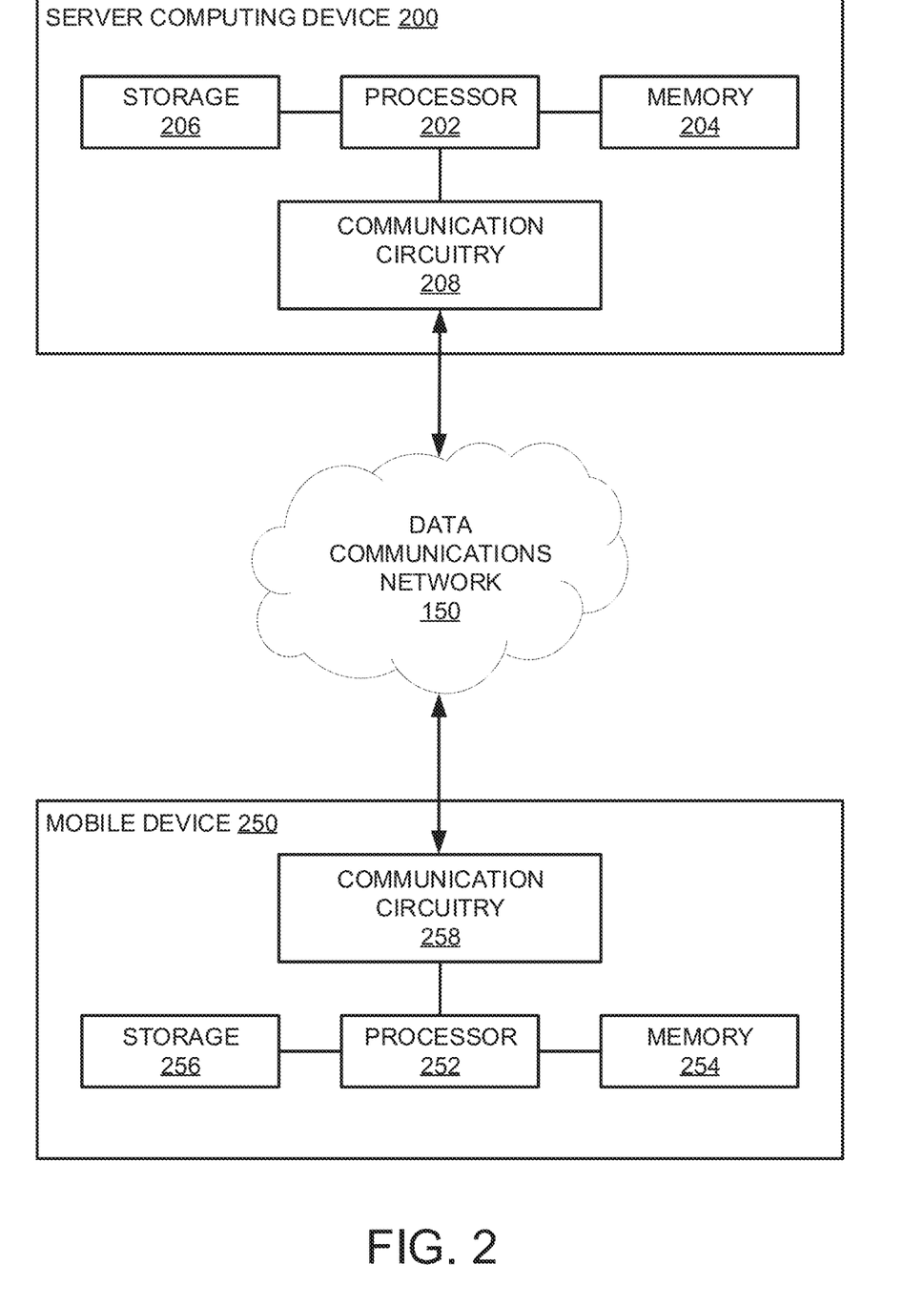
FIG. 2 is a block diagram of an exemplary server computing device and an exemplary mobile device, according to embodiments of the technology described herein.

The systems and methods described herein can be implemented using a data communications network, server computing devices, and mobile devices. For example, referring to FIGS. 1 and 2, an exemplary communications system 100 includes data communications network 150, exemplary server computing devices 200, and exemplary mobile devices 250. In some embodiments, the system 100 includes one or more server computing devices 200 and one or more mobile devices 250. Each server computing device 200 can include a processor 202, memory 204, storage 206, and communication circuitry 208. Each mobile device 250 can include a processor 252, memory 254, storage 256, and communication circuitry 258. In some embodiments, communication circuitry 208 of the server computing devices 200 is communicatively coupled to the communication circuitry 258 of the mobile devices 250 via data communications network 150. Communication circuitry 208 and communication circuitry 258 can use Bluetooth, Wi-Fi, or any comparable data transfer connection. The mobile devices 250 can include personal workstations, laptops, tablets, mobile devices, or any other comparable device.

Figure 3:
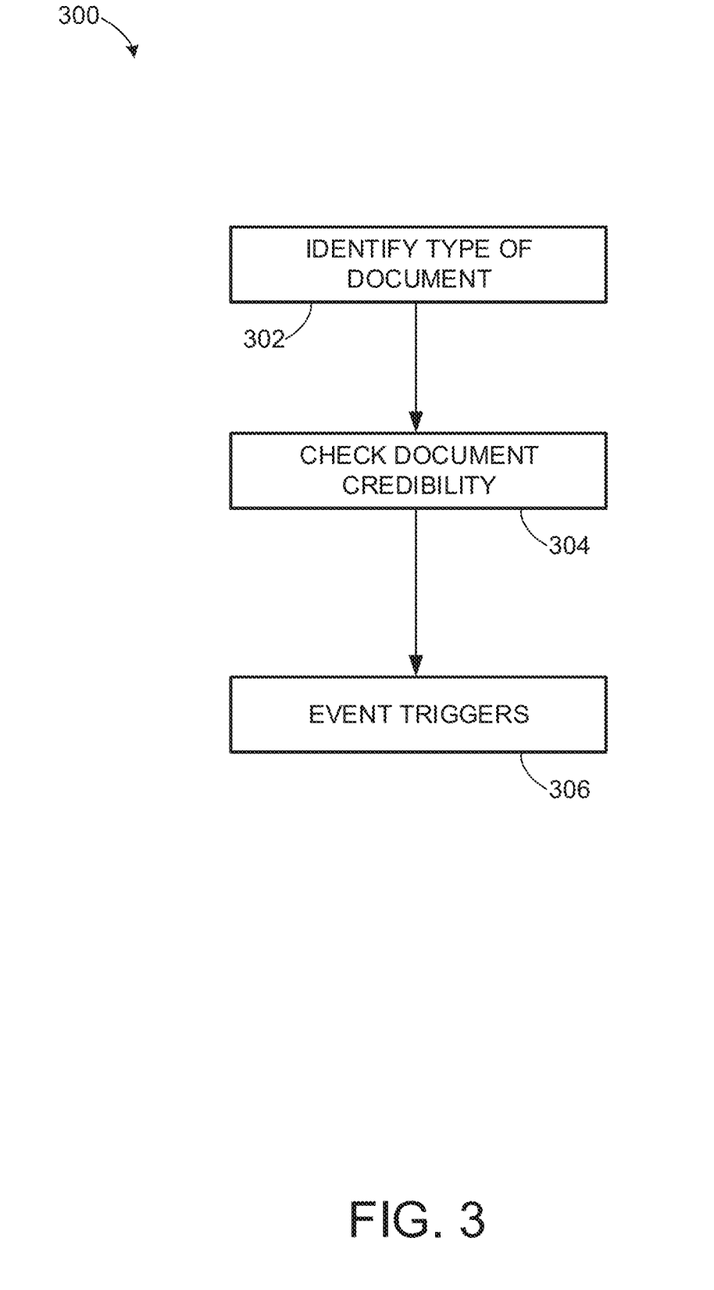
FIG. 3 is a diagram showing a visualization of an exemplary process for generating notifications based on extracted data from documents, according to embodiments of the technology described herein.

An exemplary process 300 for generating notifications based on extracted data from documents using communications system 100 is illustrated in FIG. 3. Process 300 is an exemplary intelligent OCR method, coupled with a reminder system and a notification system. As shown, process 300 includes identifying a type of document that is to be extracted in step 302, checking the document credibility in step 304, and identifying event triggers in the document in step 306. Once the event triggers have been identified, a user can activate the notification system to generate notifications corresponding to the event triggers. The intelligent OCR method is an improvement over the traditional OCR process because it labels the extracted data with data corresponding to the user.

Figure 4:
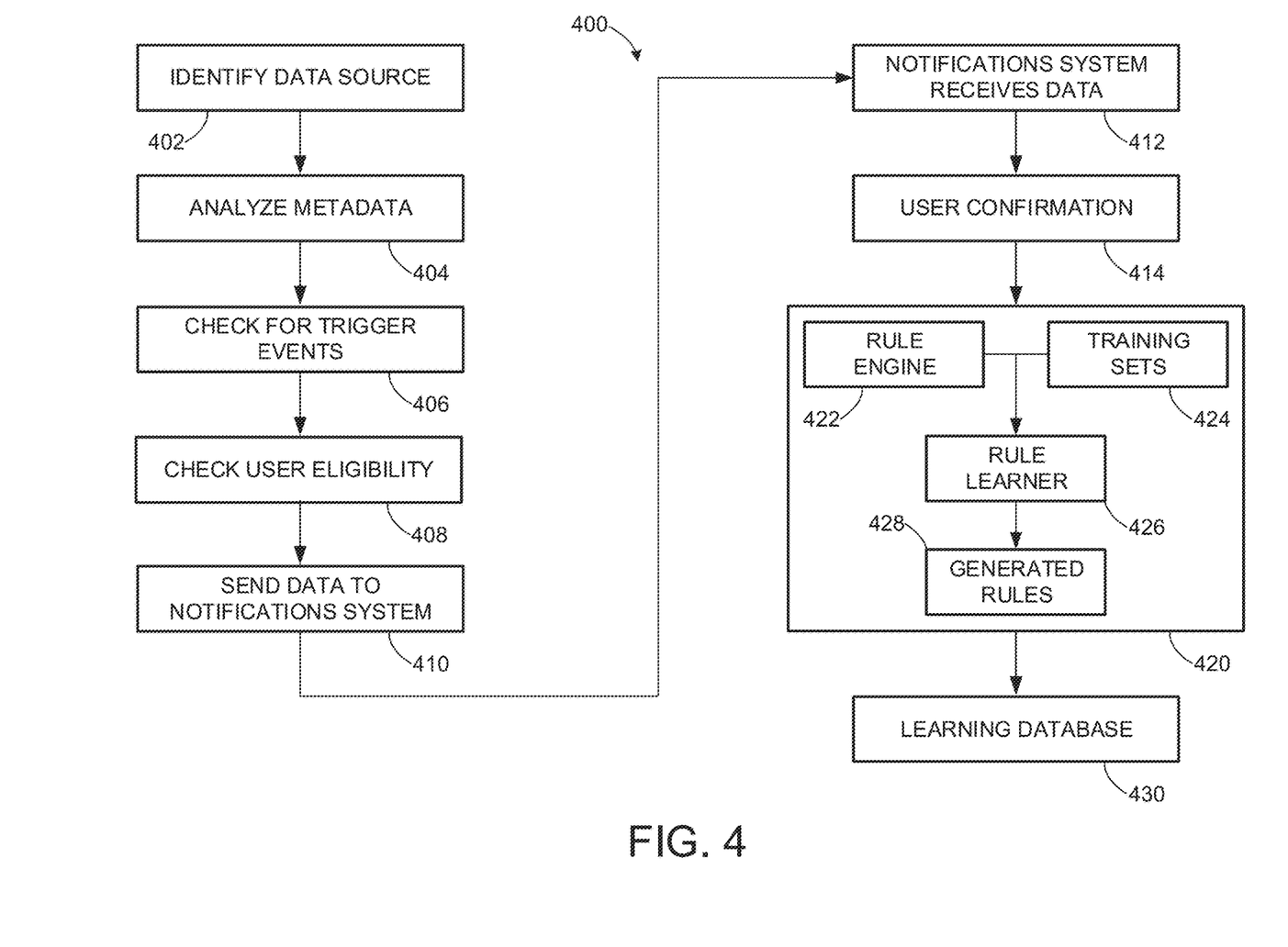
FIG. 4 is a diagram showing a visualization of an exemplary architecture for generating notifications based on extracted data from documents, according to embodiments of the technology described herein.
Figure 5:
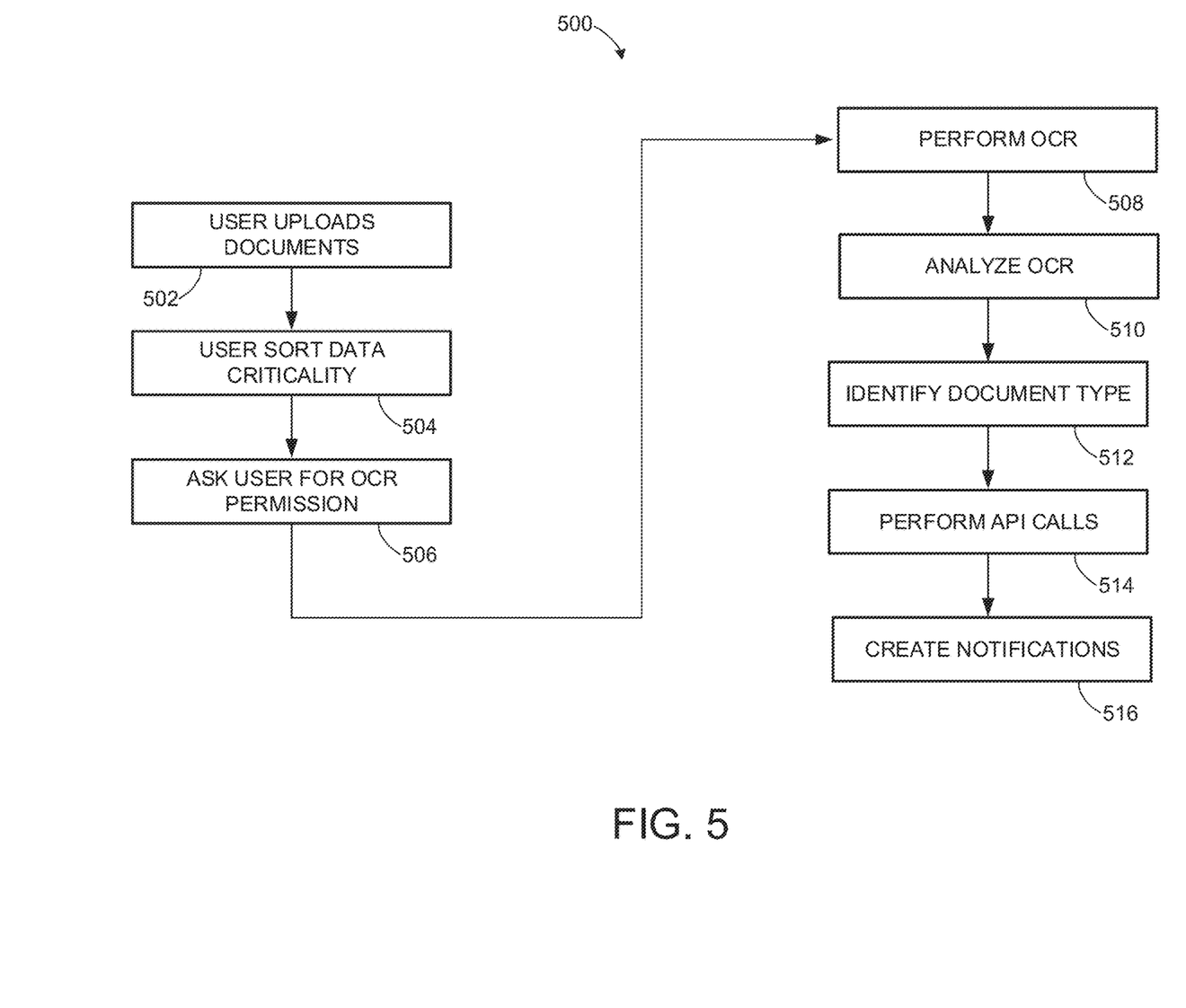
FIG. 5 is a diagram showing a visualization of an exemplary process for generating notifications based on extracted data from documents, according to embodiments of the technology described herein.

The intelligent OCR method is further illustrated in relation to FIGS. 4 and 5. An exemplary architecture 400 for generating notifications based on extracted data from documents is illustrated in FIG. 4. Architecture 400 includes the computerized steps of identifying the data source of the document in step 402, analyzing the metadata in the document in step 404, checking for trigger events that can be used to generate a notification in step 406, and checking the user's eligibility based on user data in step 408. Once the user's eligibility is confirmed, architecture 400 includes the computerized step of sending the extracted data to notifications system 420 in step 410.

Architecture 400 includes the computerized steps of receiving the extracted data by the notifications system 420 in step 412 and receiving a user confirmation in step 414. The user confirmation is an indication that the user wishes to receive a notification corresponding to the extracted trigger event. Notifications system 420 includes rule engine 422, training sets 424, rule learner 426, and generated rules 428. As described further in relation to FIG. 6, the rule engine 422 and rule learner 426 of notifications system 420 uses a machine learning algorithm or supervised learning algorithm to generate rules 428 using training sets 424. Further as described in relation to FIG. 6, architecture 400 includes a learning database 430 that stores document format data that is generated by the notification system 420.

An exemplary process 500 for generating notifications based on extracted data from documents using communications system 100 and architecture 400 is illustrated in FIG. 5. As shown, process 500 includes the computerized steps of receiving user uploaded documents in step 502, receiving criticality data corresponding to the uploaded documents in step 504 and requesting permission for performing OCR. Once permission has been granted, document data and document type data is extracted. Document type extraction involves a computerized method where the document is run through a document format database. An example of an exemplary document format database is described below in relation to FIG. 6.

Process 500 continues with the document data and document type extraction by performing OCR in step 508, analyzing the OCR data in step 510, and identifying the document type in step 512. Through a supervised learning technique, the document is categorized in the right bucket and then attached a definition. For example, a driver's license is a standard government document which has certain formats. If the user uploads the driver's license to notifications system 420, with their consent, the structure of the driver's license can be matched to the document format database 430 to confirm the document type. Another example of a document type is an SS-8 form which corresponds to a user that is typically a self-employed contractor. The next step is the data validation piece, where the document uploaded is checked for authenticity. In the driver's license context, the driver's license can be validated by comparing the extracted driver's license number to the driver's license number stored in the user's file and comparing the extracted name on the driver's license with the correct name of the user. For the SS-8 form, the system can verify if the name, workers name, social security number, and/or address are correct.

Process 500 finished by performing API calls in step 514 and creating the notifications in step 516. The event triggers feature is invoked after the document type and document data are extracted. In some embodiments, if the document has any events associated with the user, architecture 400 sets up a reminder and sends an email notification to the user corresponding to the event. In other embodiments, there are certain benefits a user is eligible for when submitting a 1099 form. For example, a user may be eligible to a benefit if they include car mileage data on the 1099 form. Architecture 400 can use user stored information to notify the user if they are eligible for a benefit. For example, a database including user uploaded documents can include the type of document the user submits, the criticality of the document, and if there are car loan documents. The car loan document may indicate the mileage that can be included in the notification that is delivered to the customer. This is an improvement over manual reminder systems. For example, manual reminder systems need to be triggered based on information entered manually. A manual reminder system may result in the missing of deadlines and/or important benefits/notifications one should receive.

Figure 6:
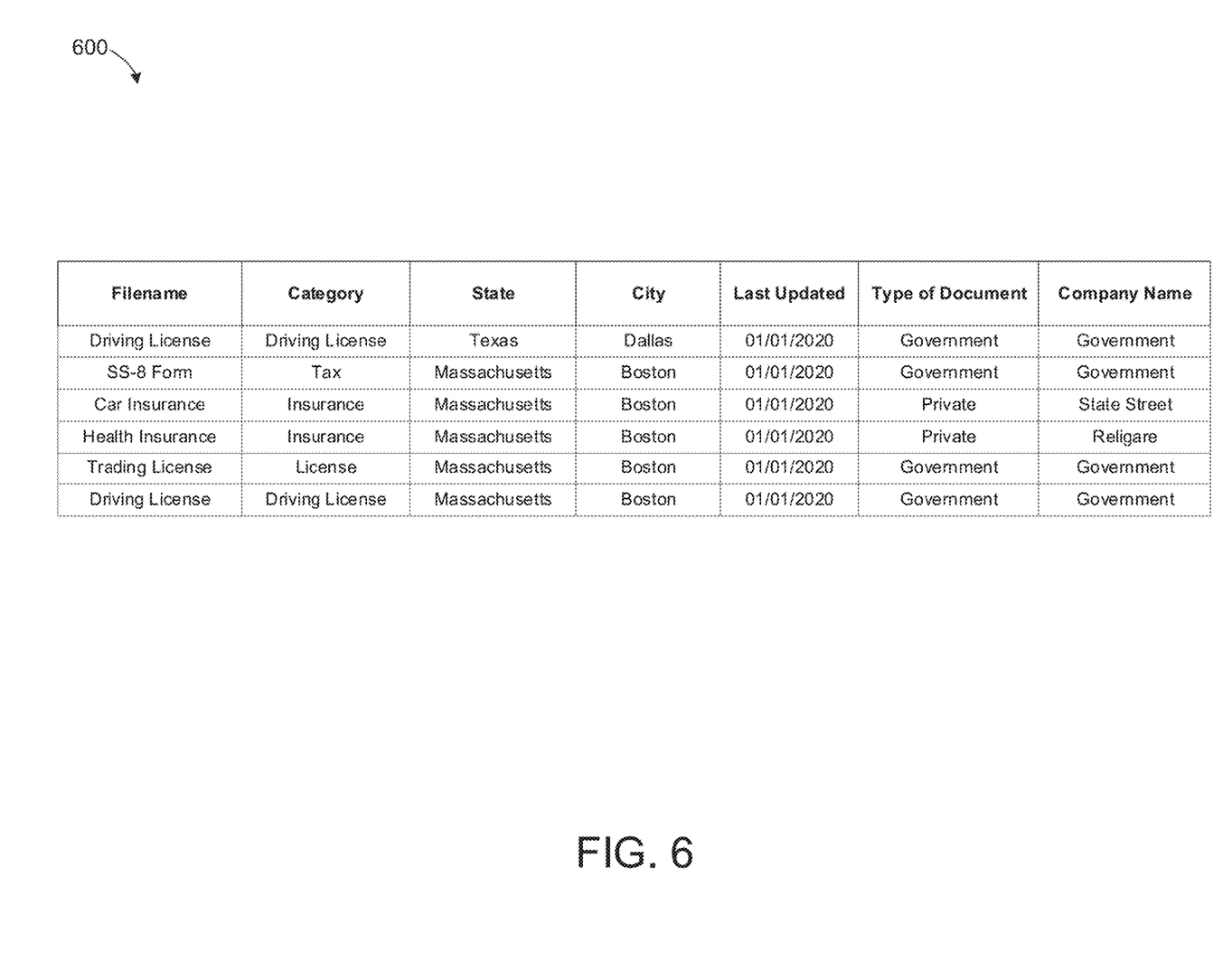
FIG. 6 is a diagram showing a visualization of an exemplary document format database, according to embodiments of the technology described herein.

An exemplary document format database 600 is illustrated in FIG. 6. As described above, document format database 600 allows for categorization of the uploaded documents. If a user uploads a document, the algorithm can categorize the data based on the state and user type information against the learned and labelled data set. The categorization is achieved through a supervised learning algorithm, where the new uploaded document will get labelled based on the output of the algorithm. Once the document is categorized, the system can perform the OCR process.

Supervised learning is the machine learning task of learning a function that maps an input to an output based on example input-output pairs. It infers a function from labeled training data consisting of a set of training examples. Each example is a pair consisting of an input object and a desired output value. A supervised learning algorithm or machine learning algorithm analyzes the training data and produces an inferred function, which can be used for mapping new examples. Examples of supervised learning algorithms include graph-based or regression.

Figure 7:
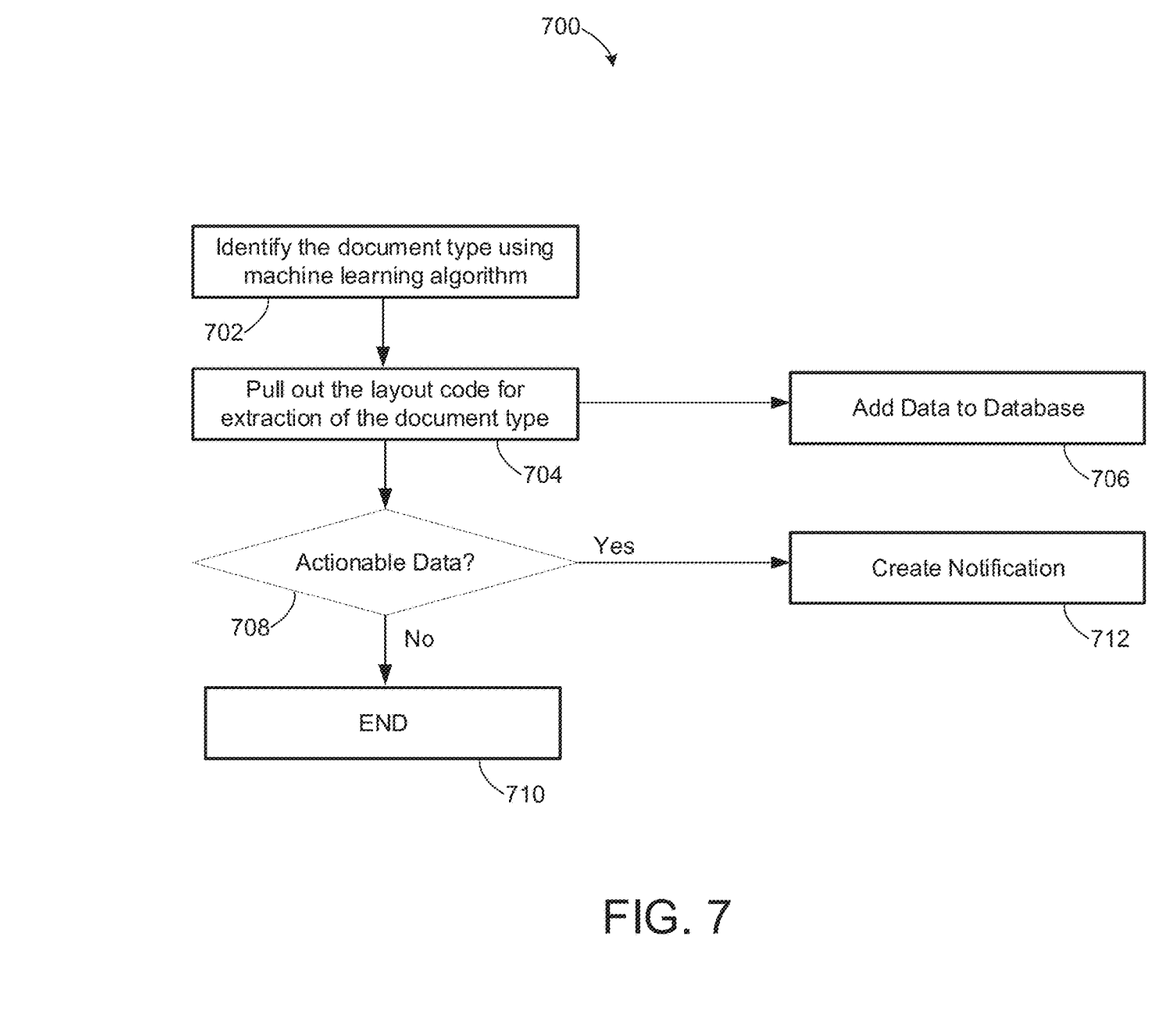
FIG. 7 is a diagram showing a visualization of an exemplary process for generating notifications based on extracted data from documents, according to embodiments of the technology described herein.

As illustrated in FIG. 7, Process 700 is an exemplary intelligent OCR method for generating notifications based on extracted data from documents. Similar to the computerized steps described in relation to FIG. 5, process 700 includes the computerized steps of identifying the document type using a machine learning algorithm in step 702, pulling out the layout code for extraction of the document type in step 704, and adding the extracted data to the database 706. Once the data has been extracted, process 700 continues by analyzing the data to determine if the extracted data includes actionable data in step 708. Actionable data 708 refers to fields from the forms on which there can be further actions. For example, a driver's license will have actionable data corresponding to an expiry date. In another example, an insurance document will have actionable data corresponding to a premium date and amount field. If actionable data exists, process 700 continues by creating a notification corresponding to the actionable data, in step 712, as described in relation to FIG. 5. Otherwise, if no actionable data exists, process 700 finishes in step 710.

Figure 8:
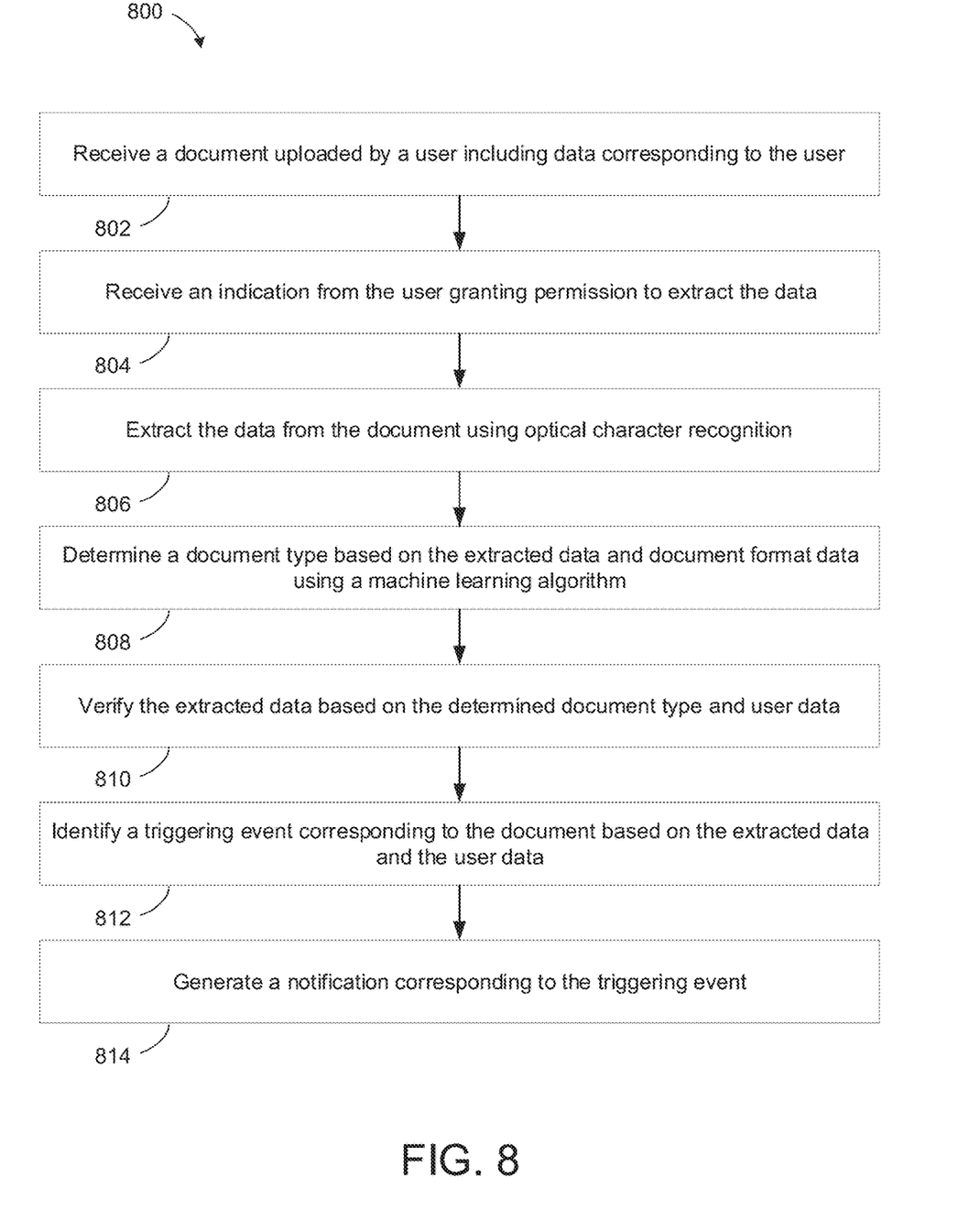
FIG. 8 is a flow diagram of a computer-implemented method for generating notifications based on extracted data from documents using a machine learning algorithm, according to embodiments of the technology described herein.

Referring to FIG. 8, a process 800 for generating notifications based on extracted data from documents using a machine learning algorithm is illustrated. The process 800 begins by receiving, by a server computing device 200, a document uploaded by a user in step 802. The document including data corresponding to the user. In some embodiments, the document includes one of a government-issued document or a privately-issued document. For example, in some embodiments, the document is one of a government-issued license, a government-issued tax document, or a privately-issued insurance document.

Process 800 continues by receiving, by the server computing device 200, an indication from the user granting permission to extract the data from the document in step 804. For example, in some embodiments, the server computing device 200 is further configured to prompt the user with a query corresponding to the indication. Process 800 continues by, in response to receiving the indication, extracting, by the server computing device 200, the data from the document using optical character recognition in step 806.

Process 800 continues by determining, by the server computing device 200, a document type based on the extracted data and document format data from a first database using a machine learning algorithm in step 808. In some embodiments, the server computing device 200 is further configured to periodically update the first database with data from websites. In other embodiments, the server computing device 200 is further configured to update the document format data from the first database based on the determined document type.

Process 800 continues by verifying, by the server computing device 200, the extracted data based on the determined document type and user data from a second database in step 810. In some embodiments, the server computing device 200 is further configured to update the user data from the second database based on the extracted data. Process 800 continues by, in response to verifying the extracted data, identifying, by the server computing device 200, a triggering event corresponding to the document based on the extracted data and the user data in step 812. In some embodiments, triggering event includes a deadline for performing an action corresponding to the document.

Process 800 finishes by generating, by the server computing device 200, a notification corresponding to the triggering event in step 814. For example, in some embodiments, the server computing device 200 is further configured to generate for display the notification on a user device. In other embodiments, the server computing device 200 is further configured to generate an email to the user including the notification.

In some embodiments, the server computing device 200 is further configured to identify a website for performing the action corresponding to the triggering event. For example, in some embodiments, the notification includes information corresponding to the website and the action. The notification can include the link to the website and the steps necessary to complete the action.

In some aspects, process 800 can be implemented on a system for generating notifications based on extracted data from documents using a machine learning algorithm. The system includes a server computing device 200 communicatively coupled to a first database, a second database, and a user device 250. The server computing device 200 is configured to receive a document uploaded by a user. The document including data corresponding to the user. The server computing device 200 is also configured to receive an indication from the user granting permission to extract the data from the document. Further, in response to receiving the indication, the server computing device 200 is configured to extract the data from the document using optical character recognition. The server computing device 200 is also configured to determine a document type based on the extracted data and document format data from the first database using a machine learning algorithm.

Further, the server computing device 200 is configured to verify the extracted data based on the determined document type and user data from the second database. In response to verifying the extracted data, the server computing device 200 is further configured to identify a triggering event corresponding to the document based on the extracted data and the user data. The server computing device 200 is also configured to generate a notification corresponding to the triggering event. In some embodiments, the server computing device 200 is further configured to generate for display the notification on the user device 250.

The above-described techniques can be implemented in digital and/or analog electronic circuitry, or in computer hardware, firmware, software, or in combinations of them. The implementation can be as a computer program product, i.e., a computer program tangibly embodied in a machine-readable storage device, for execution by, or to control the operation of, a data processing apparatus, e.g., a programmable processor, a computer, and/or multiple computers. A computer program can be written in any form of computer or programming language, including source code, compiled code, interpreted code and/or machine code, and the computer program can be deployed in any form, including as a stand-alone program or as a subroutine, element, or other unit suitable for use in a computing environment. A computer program can be deployed to be executed on one computer or on multiple computers at one or more sites. The computer program can be deployed in a cloud computing environment (e.g., Amazon® AWS, Microsoft® Azure, IBM®).

Method steps can be performed by one or more processors executing a computer program to perform functions of the invention by operating on input data and/or generating output data. Method steps can also be performed by, and an apparatus can be implemented as, special purpose logic circuitry, e.g., a FPGA (field programmable gate array), a FPAA (field-programmable analog array), a CPLD (complex programmable logic device), a PSoC (Programmable System-on-Chip), ASIP (application-specific instruction-set processor), or an ASIC (application-specific integrated circuit), or the like. Subroutines can refer to portions of the stored computer program and/or the processor, and/or the special circuitry that implement one or more functions.

Processors suitable for the execution of a computer program include, by way of example, special purpose microprocessors specifically programmed with instructions executable to perform the methods described herein, and any one or more processors of any kind of digital or analog computer. Generally, a processor receives instructions and data from a read-only memory or a random access memory or both. The essential elements of a computer are a processor for executing instructions and one or more memory devices for storing instructions and/or data. Memory devices, such as a cache, can be used to temporarily store data. Memory devices can also be used for long-term data storage. Generally, a computer also includes, or is operatively coupled to receive data from or transfer data to, or both, one or more mass storage devices for storing data, e.g., magnetic, magneto-optical disks, or optical disks. A computer can also be operatively coupled to a communications network in order to receive instructions and/or data from the network and/or to transfer instructions and/or data to the network. Computer-readable storage mediums suitable for embodying computer program instructions and data include all forms of volatile and non-volatile memory, including by way of example semiconductor memory devices, e.g., DRAM, SRAM, EPROM, EEPROM, and flash memory devices; magnetic disks, e.g., internal hard disks or removable disks; magneto-optical disks; and optical disks, e.g., CD, DVD, HD-DVD, and Blu-ray disks. The processor and the memory can be supplemented by and/or incorporated in special purpose logic circuitry.

To provide for interaction with a user, the above described techniques can be implemented on a computing device in communication with a display device, e.g., a CRT (cathode ray tube), plasma, or LCD (liquid crystal display) monitor, a mobile device display or screen, a holographic device and/or projector, for displaying information to the user and a keyboard and a pointing device, e.g., a mouse, a trackball, a touchpad, or a motion sensor, by which the user can provide input to the computer (e.g., interact with a user interface element). Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, and/or tactile input.

The above-described techniques can be implemented in a distributed computing system that includes a back-end component. The back-end component can, for example, be a data server, a middleware component, and/or an application server. The above described techniques can be implemented in a distributed computing system that includes a front-end component. The front-end component can, for example, be a client computer having a graphical user interface, a Web browser through which a user can interact with an example implementation, and/or other graphical user interfaces for a transmitting device. The above described techniques can be implemented in a distributed computing system that includes any combination of such back-end, middleware, or front-end components.

The components of the computing system can be interconnected by transmission medium, which can include any form or medium of digital or analog data communication (e.g., a communication network). Transmission medium can include one or more packet-based networks and/or one or more circuit-based networks in any configuration. Packet-based networks can include, for example, the Internet, a carrier internet protocol (IP) network (e.g., local area network (LAN), wide area network (WAN), campus area network (CAN), metropolitan area network (MAN), home area network (HAN)), a private IP network, an IP private branch exchange (IPBX), a wireless network (e.g., radio access network (RAN), Bluetooth, near field communications (NFC) network, Wi-Fi, WiMAX, general packet radio service (GPRS) network, HiperLAN), and/or other packet-based networks. Circuit-based networks can include, for example, the public switched telephone network (PSTN), a legacy private branch exchange (PBX), a wireless network (e.g., RAN, code-division multiple access (CDMA) network, time division multiple access (TDMA) network, global system for mobile communications (GSM) network), and/or other circuit-based networks.

Information transfer over transmission medium can be based on one or more communication protocols. Communication protocols can include, for example, Ethernet protocol, Internet Protocol (IP), Voice over IP (VOIP), a Peer-to-Peer (P2P) protocol, Hypertext Transfer Protocol (HTTP), Session Initiation Protocol (SIP), H.323, Media Gateway Control Protocol (MGCP), Signaling System #7 (SS7), a Global System for Mobile Communications (GSM) protocol, a Push-to-Talk (PTT) protocol, a PTT over Cellular (POC) protocol, Universal Mobile Telecommunications System (UMTS), 3GPP Long Term Evolution (LTE) and/or other communication protocols.

Devices of the computing system can include, for example, a computer, a computer with a browser device, a telephone, an IP phone, a mobile device (e.g., cellular phone, personal digital assistant (PDA) device, smart phone, tablet, laptop computer, electronic mail device), and/or other communication devices. The browser device includes, for example, a computer (e.g., desktop computer and/or laptop computer) with a World Wide Web browser (e.g., Chrome™ from Google, Inc., Microsoft® Internet Explorer® available from Microsoft Corporation, and/or Mozilla® Firefox available from Mozilla Corporation). Mobile computing device include, for example, a Blackberry® from Research in Motion, an iPhone® from Apple Corporation, and/or an Android™-based device. IP phones include, for example, a Cisco® Unified IP Phone 7985G and/or a Cisco® Unified Wireless Phone 7920 available from Cisco Systems, Inc.

The above-described techniques can be implemented using supervised learning and/or machine learning algorithms. Supervised learning is the machine learning task of learning a function that maps an input to an output based on example input-output pairs. It infers a function from labeled training data consisting of a set of training examples. Each example is a pair consisting of an input object and a desired output value. A supervised learning algorithm or machine learning algorithm analyzes the training data and produces an inferred function, which can be used for mapping new examples.

Comprise, include, and/or plural forms of each are open ended and include the listed parts and can include additional parts that are not listed. And/or is open ended and includes one or more of the listed parts and combinations of the listed parts.

One skilled in the art will realize the subject matter may be embodied in other specific forms without departing from the spirit or essential characteristics thereof. The foregoing embodiments are therefore to be considered in all respects illustrative rather than limiting of the subject matter described herein.

What is claimed:

1. A computerized method for generating notifications based on extracted data from documents using a machine learning algorithm, the method comprising:
   receiving, by a server computing device, a document uploaded by a user, wherein the document comprises data corresponding to the user;
   receiving, by the server computing device, an indication from the user granting permission to extract the data from the document;
   in response to receiving the indication, extracting, by the server computing device, the data from the document using optical character recognition;
   determining, by the server computing device, a document type based on the extracted data and document format data from a first database using a machine learning algorithm;
   verifying, by the server computing device, the extracted data based on the determined document type and user data from a second database;
   in response to verifying the extracted data, identifying, by the server computing device, a triggering event corresponding to the document based on the extracted data and the user data; and
   generating, by the server computing device, a notification corresponding to the triggering event.

2. The computerized method of claim 1, wherein the document comprises one of a government-issued document or a privately-issued document.

3. The computerized method of claim 1, wherein the server computing device is further configured to prompt the user with a query corresponding to the indication.

4. The computerized method of claim 1, wherein the server computing device is further configured to periodically update the first database with data from a plurality of websites.

5. The computerized method of claim 1, wherein the server computing device is further configured to update the document format data from the first database based on the determined document type.

6. The computerized method of claim 1, wherein the server computing device is further configured to update the user data from the second database based on the extracted data.

7. The computerized method of claim 1, wherein the triggering event comprises a deadline for performing an action corresponding to the document.

8. The computerized method of claim 1, wherein the server computing device is further configured to generate for display the notification on a user device.

9. The computerized method of claim 1, wherein the server computing device is further configured to identify a website for performing an action corresponding to the triggering event.

10. The computerized method of claim 9, wherein the notification comprises information corresponding to the website and the action.

11. A system for generating notifications based on extracted data from documents using a machine learning algorithm, the system comprising:
a server computing device communicatively coupled to a first database, a second database, and a user device, the server computing device configured to:
receive a document uploaded by a user, wherein the document comprises data corresponding to the user;
receive an indication from the user granting permission to extract the data from the document;
in response to receiving the indication, extract the data from the document using optical character recognition;
determine a document type based on the extracted data and document format data from the first database using a machine learning algorithm;
verify the extracted data based on the determined document type and user data from the second database;
in response to verifying the extracted data, identify a triggering event corresponding to the document based on the extracted data and the user data; and
generate a notification corresponding to the triggering event.

12. The system of claim 11, wherein the document comprises one of a government-issued document or a privately-issued document.

13. The system of claim 11, wherein the server computing device is further configured to prompt the user with a query corresponding to the indication.

14. The system of claim 11, wherein the server computing device is further configured to periodically update the first database with data from a plurality of websites.

15. The system of claim 11, wherein the server computing device is further configured to update the document format data from the first database based on the determined document type.

16. The system of claim 11, wherein the server computing device is further configured to update the user data from the second database based on the extracted data.

17. The system of claim 11, wherein the triggering event comprises a deadline for performing an action corresponding to the document.

18. The system of claim 11, wherein the server computing device is further configured to generate for display the notification on the user device.

19. The system of claim 11, wherein the server computing device is further configured to identify a website for performing an action corresponding to the triggering event.

20. The system of claim 19, wherein the notification comprises information corresponding to the website and the action.

\* \* \* \* \*